United States Patent
Fecteau et al.

(10) Patent No.: US 7,237,637 B2
(45) Date of Patent: *Jul. 3, 2007

(54) THREE-WHEEL VEHICLE AND CONCENTRIC SPROCKET ASSEMBLY THEREFOR

(75) Inventors: Berthold Fecteau, Richmond (CA); Bruno Girouard, Montreal (CA); Alain Massicotte, Orford (CA); Mathieu Audet, Montreal (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/184,955

(22) Filed: Jul. 20, 2005

(65) Prior Publication Data

US 2005/0247507 A1    Nov. 10, 2005

Related U.S. Application Data

(63) Continuation of application No. 10/371,223, filed on Feb. 24, 2003, now Pat. No. 6,948,581.

(60) Provisional application No. 60/418,355, filed on Oct. 16, 2002, provisional application No. 60/358,436, filed on Feb. 22, 2002, provisional application No. 60/358,400, filed on Feb. 22, 2002.

(51) Int. Cl.
*B62D 61/06* (2006.01)
(52) U.S. Cl. .................................................. 180/210
(58) Field of Classification Search ................ 180/210, 180/211, 213, 217
See application file for complete search history.

(56) References Cited

U.S. PATENT DOCUMENTS

| 4,325,449 A | * | 4/1982 | D'Addio et al. | ............ 180/217 |
| 4,787,470 A | * | 11/1988 | Badsey | ........................ 180/210 |

FOREIGN PATENT DOCUMENTS

| DE | 3546073 | 7/1987 |
| EP | 0082496 | 6/1983 |
| FR | 2346174 | 10/1977 |
| FR | 2573024 | 5/1986 |
| GB | 2142591 | 1/1985 |
| JP | 60092121 A * | 5/1985 |
| WO | WO 98/43873 | 10/1998 |

* cited by examiner

*Primary Examiner*—Faye M. Fleming
(74) *Attorney, Agent, or Firm*—Osler, Hoskin & Harcourt LLP

(57) ABSTRACT

A three-wheel vehicle has two forward steered wheels and one rear powered wheel operatively connected to an engine disposed on a frame assembly. A straddle-type seat is disposed between the forward and rear wheels. A rear swing arm is pivotally connected at a first end to the frame at a pivot point and rotatably supports the rear wheel at a second end. A concentric sprocket assembly having first and second sprockets is attached to the swing arm at the pivot point. A transmission member operatively connects an output shaft of the engine and the first sprocket and a second endless flexible transmission member is operatively connected between the rear wheel and the second sprocket. An eccentric endless flexible transmission member tension adjustment mechanism is attached to the swing arm to move the concentric assembly sprocket relative to a longitudinal axis of the swing arm.

20 Claims, 18 Drawing Sheets

THREE-WHEEL VEHICLE AND CONCENTRIC SPROCKET ASSEMBLY THEREFOR

This application is a continuation of U.S. application Ser. No. 10/371,223, filed on Feb. 24, 2003 now is U.S. Pat. No 6,948,581. Through Ser. No. 10/371,223, this application claims priority to U.S. Provisional Applications 60/358,436, and 60/358,400, both filed Feb. 22, 2002, and to U.S. Provisional Application 60/418,355, filed Oct. 16, 2002. The contents of all of the above-mentioned applications are incorporated herein by reference.

BACKGROUND OF THE INVENTION

1. Field of the Invention

The present invention relates generally to a three-wheel vehicle, more particularly, to a concentric intermediate sprocket assembly for a three-wheel vehicle.

2. Description of Related Art

The three-wheel vehicle of the present invention is significantly improved over the straddle-type three-wheel vehicles with two front wheels and one rear wheel that are found in the prior art.

U.S. Pat. No. 4,787,470 discloses a three-wheel vehicle with two front wheels and a single rear wheel having a body formed by an ATV (all terrain vehicle) frame carrying two front fenders, one rear fender, and a straddle-type seat. An engine is supported on the frame but is exposed to the exterior of the vehicle body. The 470 patent also discloses a vehicle with a trailing arm assembly that rotatably supports the rear wheel for suspension movement relative to the frame. The trailing arm includes a pair of arm portions that extend on opposite sides of the rear wheel. The arm portions are joined to a single forwardly extending arm portion that is pivotally supported on the frame about a pivot axis. In addition, the 470 patent also discloses a sprocket supported by the trailing arm assembly at a point between the pivot axis and the end of the trailing arm assembly. The sprocket is supported on an intermediate shaft and engages a first endless chain driven by an output shaft of the engine. The intermediate shaft includes another sprocket on an outer end that engages and drives a second endless chain that drives the rear wheel. An output shaft of the engine drives the second endless chain that is connected between the output shaft and the intermediate shaft. As the intermediate shaft is on the trailing arm and the output shaft is on the frame, the lengths of the endless chains will vary as the trailing arm is displaced relative to the frame.

U.S. Patent Application Publication 2002/0017765 A1 discloses a three-wheel vehicle, including two front wheels and a single rear wheel, based on a snowmobile frame. The rear wheel is driven by an endless drive chain that extends between a sprocket on the rear wheel and a sprocket connected to a drive shaft. The drive shaft sprocket is connected to a continuously variable transmission (CVT) of an internal combustion engine by a endless chain.

Prior art three-wheel vehicles, such as the one described in the 470 patent, suffer from a number of shortcomings. For example, transmitting power from the engine to the rear wheel on vehicles, especially those that rely on a chain drive, poses particular difficulties. Specifically, if the drive chain is connected between the output shaft of the engine and the rear drive wheel and the distance from the engine output shaft to the drive wheel is particularly long, as the rear suspension flexes under stress, the chain length varies. This may cause difficulties, especially if the rear suspension collapses due to a significant extent. In particular, if the rear swing arm collapses toward the frame a sufficient distance, the chain tension may become sufficiently relaxed (i.e., slack) that the chain may disengage from the sprocket attached to the engine output shaft or the sprocket attached to the axle on which the rear wheel is disposed. Alternatively, if the rear swing arm extends a sufficient distance from the frame, a sufficient amount of tension may be applied to the chain to cause it to break.

As another example, the position of the drive shaft and the drive shaft sprocket of the 765 application publication is not adjustable and slack or tension that develops in the chain between the rear wheel sprocket and the drive shaft sprocket or in the chain between the drive shaft sprocket and the CVT may not be compensated for.

A CVT is considered to be superior to a traditional geared transmission because, unlike a traditional gear box that provides four or five separate gears, a CVT provides an infinite number of "gears." As a result, CVT's are much more efficient at transmitting torque from the engine to the driven wheel.

Although the three-wheel vehicle disclosed in the 765 application publication includes a CVT, as the vehicle is based on a snowmobile frame, the output shaft of the CVT is placed above the drive shaft of the engine for connection to the endless track propulsion system of the snowmobile. Upon conversion of the snowmobile to the three-wheel vehicle, the output shaft of the CVT is connected to the drive shaft sprocket through a chain, which decreases the efficiency of the CVT to drive the rear wheel of the three wheeled vehicle.

The difficulties associated with chain drives for vehicles, especially three-wheel vehicles, has created a need for an improved construction where the chain driving the rear wheel is not subjected to excessive tension or slack and is driven with the highest possible efficiency by the engine.

SUMMARY OF THE INVENTION

An aspect of the present invention is a three-wheel vehicle including a frame, an engine supported by the frame, a pair of front wheels supported by the frame, a single rear wheel, a swing arm rotatably supporting the rear wheel at a first end and pivotally connected to the frame at a second end at a pivot point; concentric sprocket assembly attached to the frame at the pivot point, the concentric sprocket assembly including a sprocket and a rotary member, a first transmission element operatively connecting an output shaft of the engine and the rotary member, and a second endless flexible transmission element operatively connecting the sprocket to the rear wheel to drive the rear wheel.

Another aspect of the present invention is a three-wheel vehicle wherein the rear swing arm is forked shaped and includes fork members and the concentric sprocket assembly is fixed to one of the fork member laterally outward of the fork member. A further aspect of the invention is a three-wheel vehicle wherein the rear swing arm is forked shaped and includes fork members and the concentric sprocket assembly is fixed to one of the fork member laterally inward of the fork member.

Another aspect of the present invention is a three-wheel vehicle wherein the rotary member of the concentric sprocket assembly is a pulley of a CVT that is operatively connected to an output shaft of the engine by the first endless flexible transmission element which is a belt. It is a further aspect of the present invention to provide a speed reducing mechanism between the sprocket and the pulley. It is still a further aspect of the present invention that the speed reducing mechanism is a gear box. It is still a further aspect of the invention that the speed reducing mechanism is a second sprocket coaxial with the sprocket and a third sprocket coaxial with the rotary member, the third sprocket having a smaller diameter than the second sprocket and connected to the second sprocket by an endless chain.

Another aspect of the present invention is a three-wheel vehicle including an eccentric chain tension adjustment mechanism that adjusts the position of the concentric sprocket assembly along a longitudinal axis of the swing arm. It is a further aspect of the invention that the eccentric chain tension adjustment mechanism is indexable among a plurality of positions.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION

Before delving into the specific details of the present invention, it should be noted that the conventions "left," "right," "front," "rear," "up," and "down" are defined according to the normal, forward travel direction of the vehicle being discussed. As a result, the "left" side of a vehicle corresponds to the left side of a rider seated in a forward-facing position on the vehicle.

Figure 1:
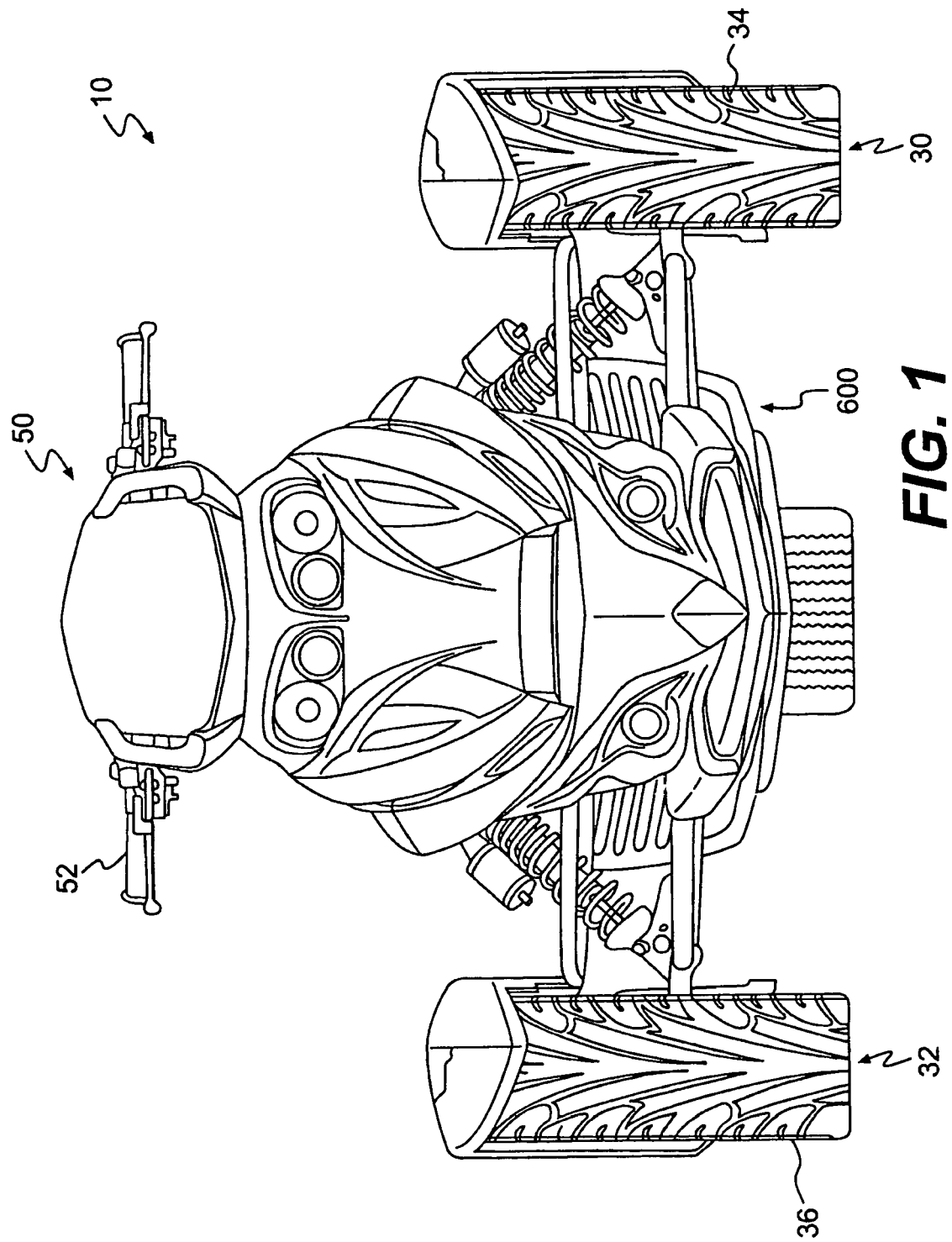
FIG. 1 is front view of a three-wheel vehicle according to the present invention.
Figure 2:
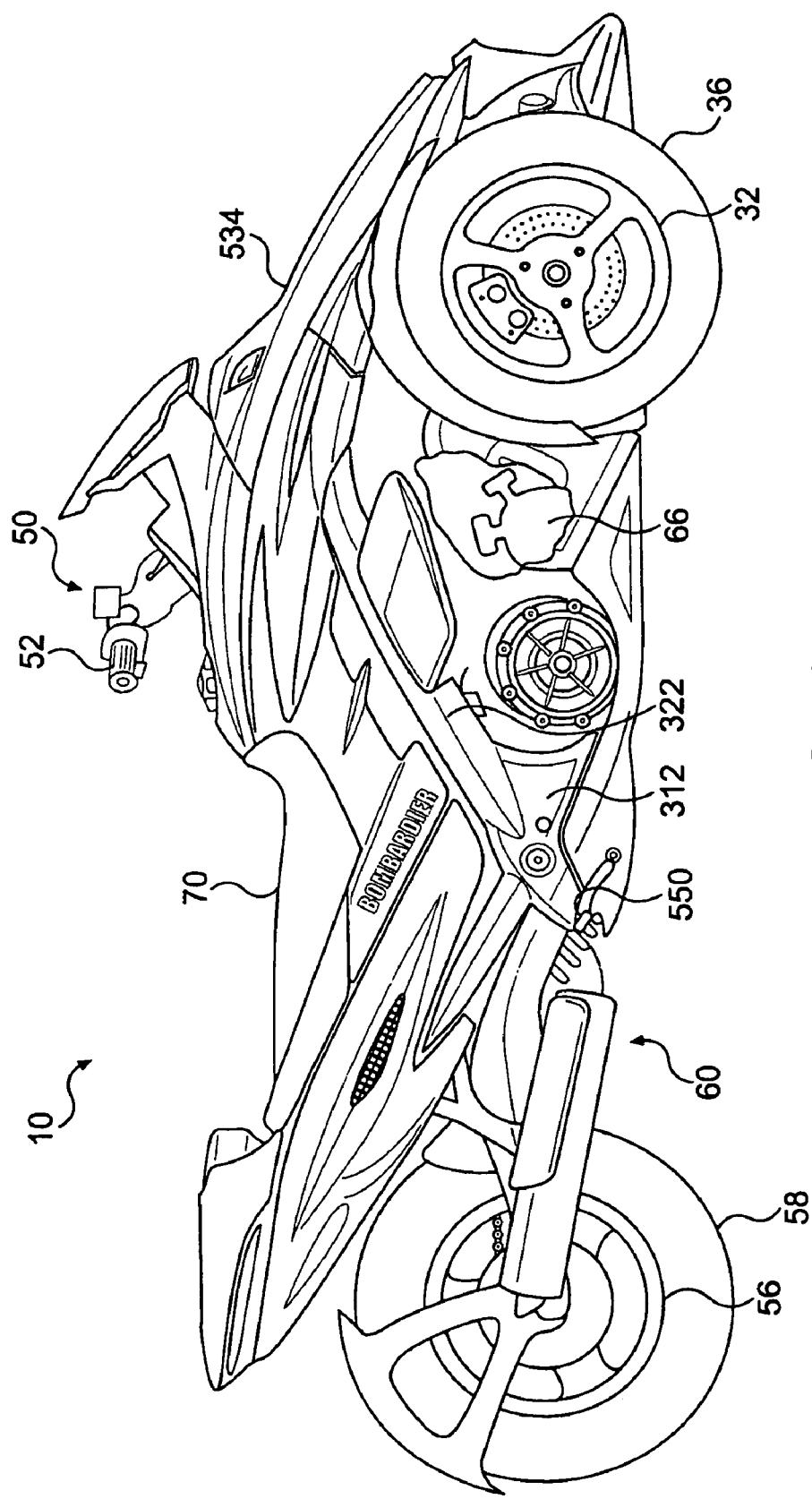
FIG. 2 is a right side view thereof.
Figure 3:
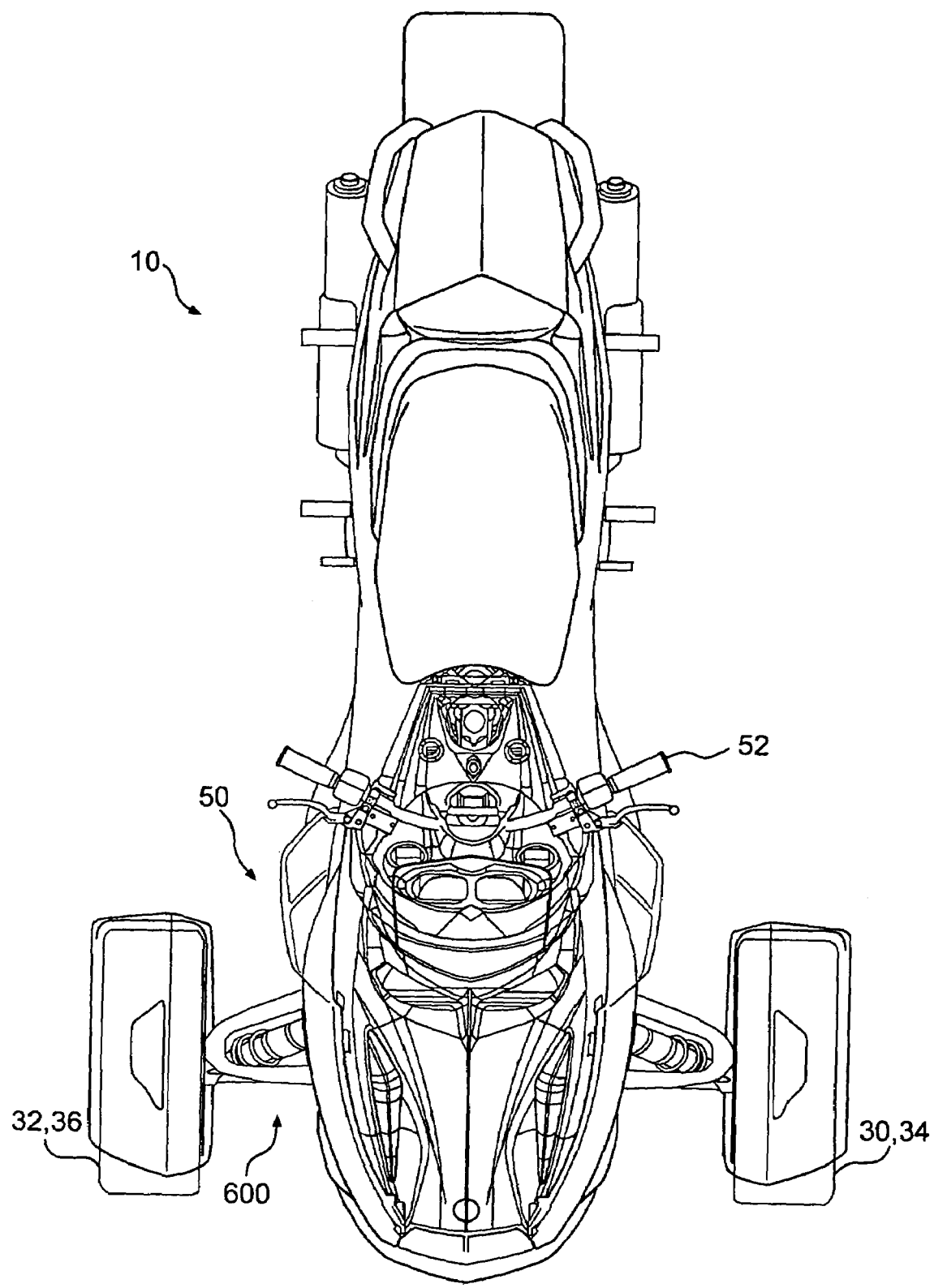
FIG. 3 is a top view thereof.
Figure 4:
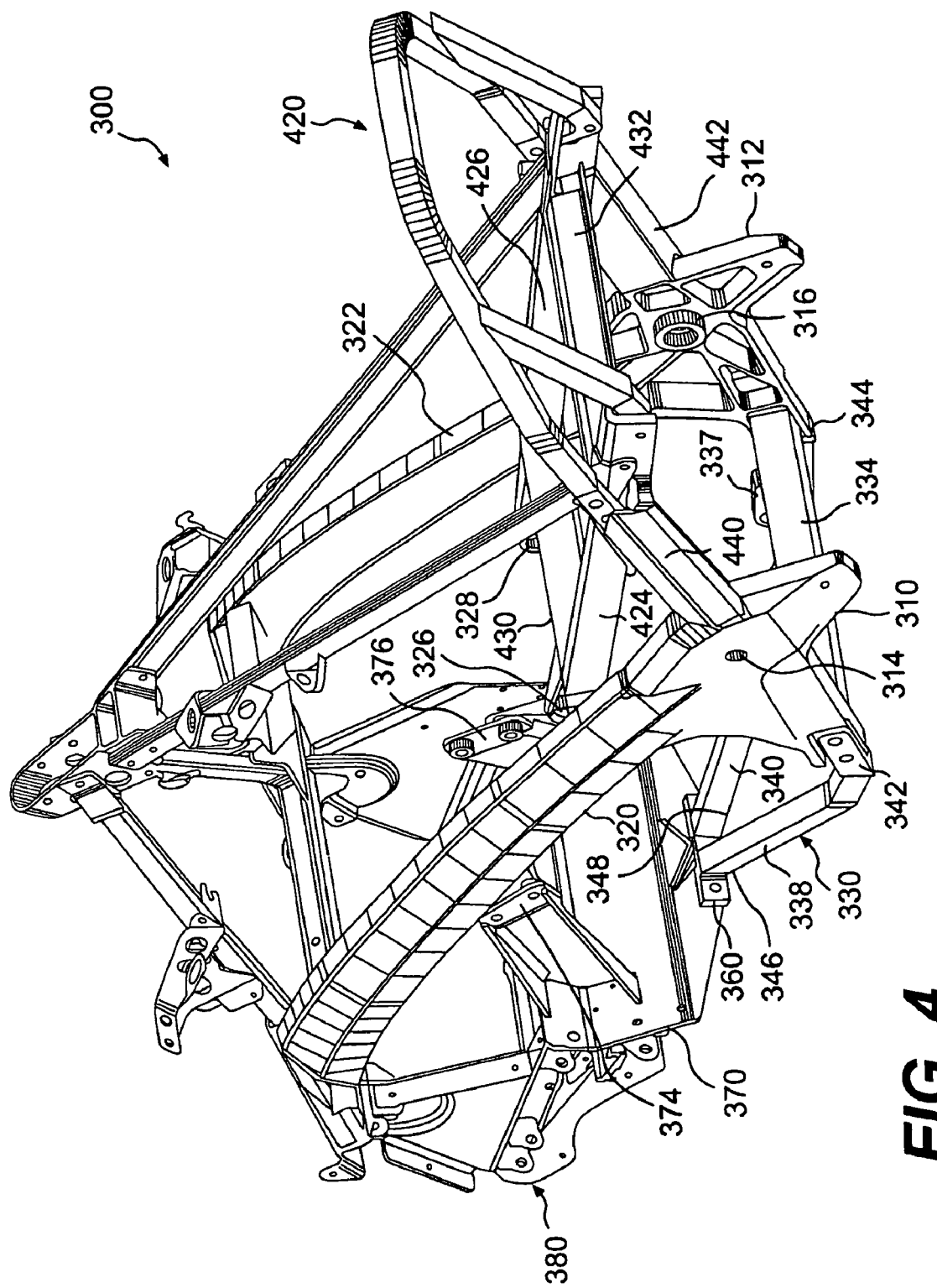
FIG. 4 is a perspective view of a frame assembly according to the present invention, as viewed from the rear left side.
Figure 5:
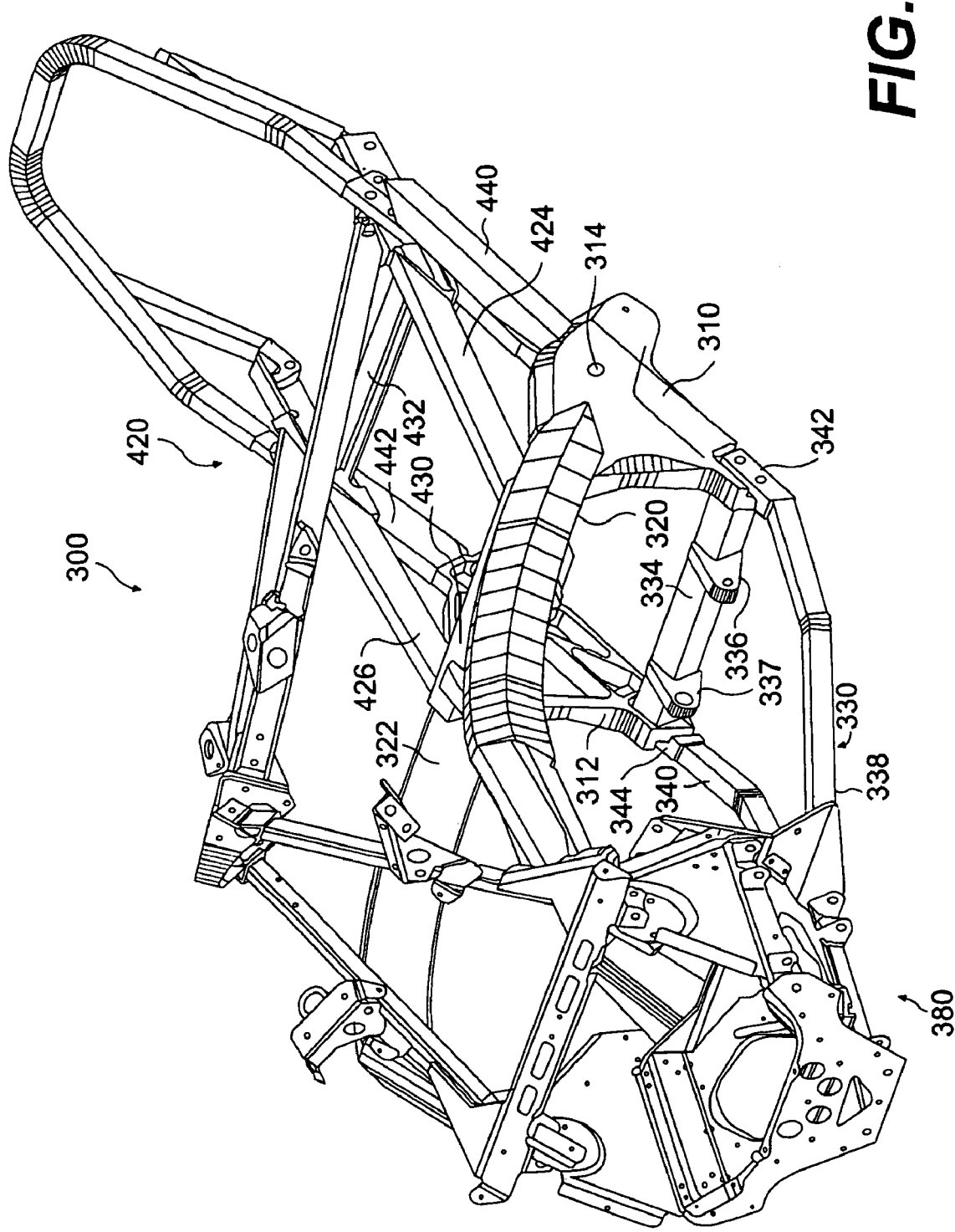
FIG. 5 is a perspective view of the frame assembly, as viewed from the forward left side.
Figure 6:
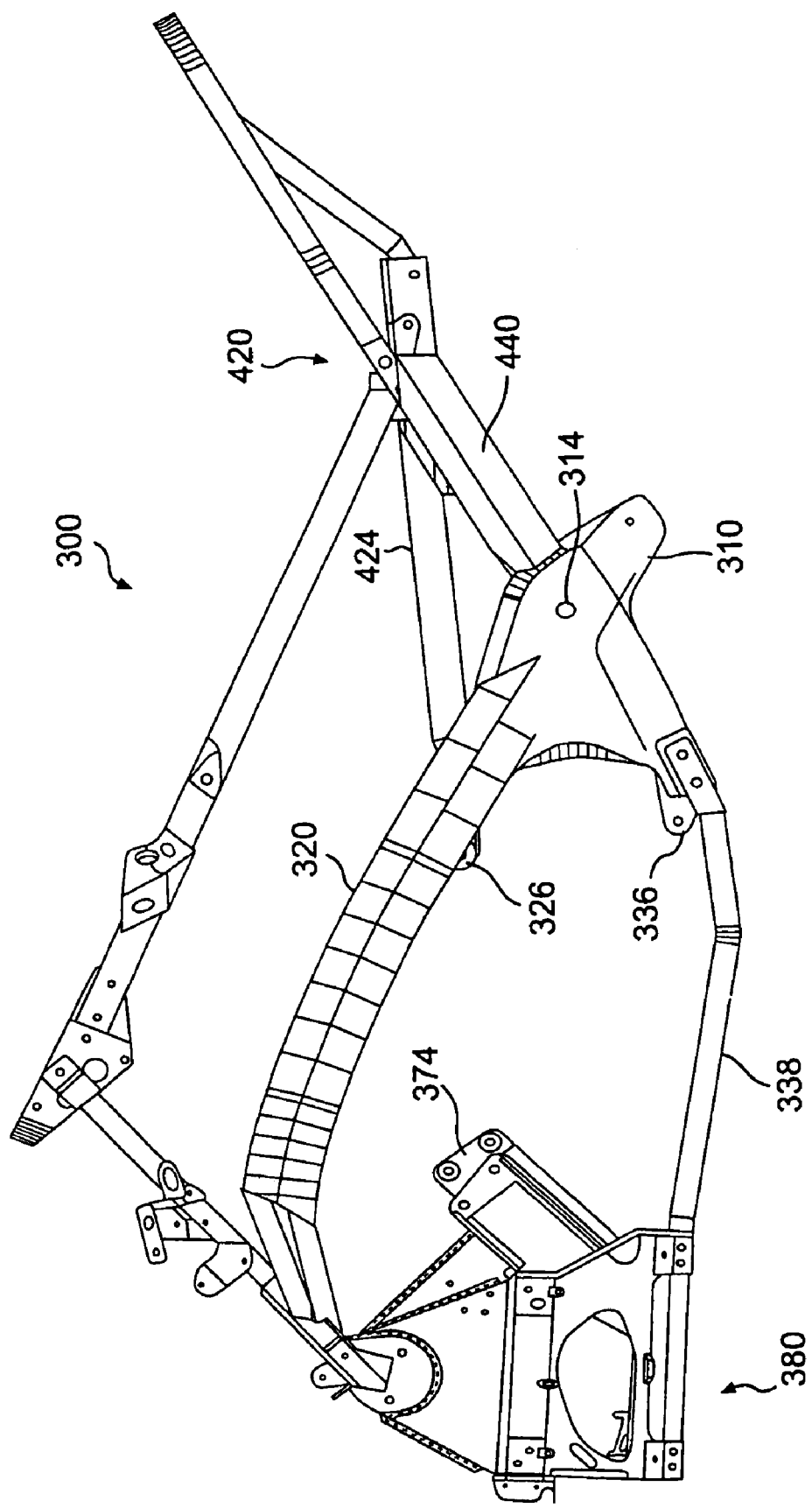
FIG. 6 is a left side view of the frame assembly.
Figure 7:
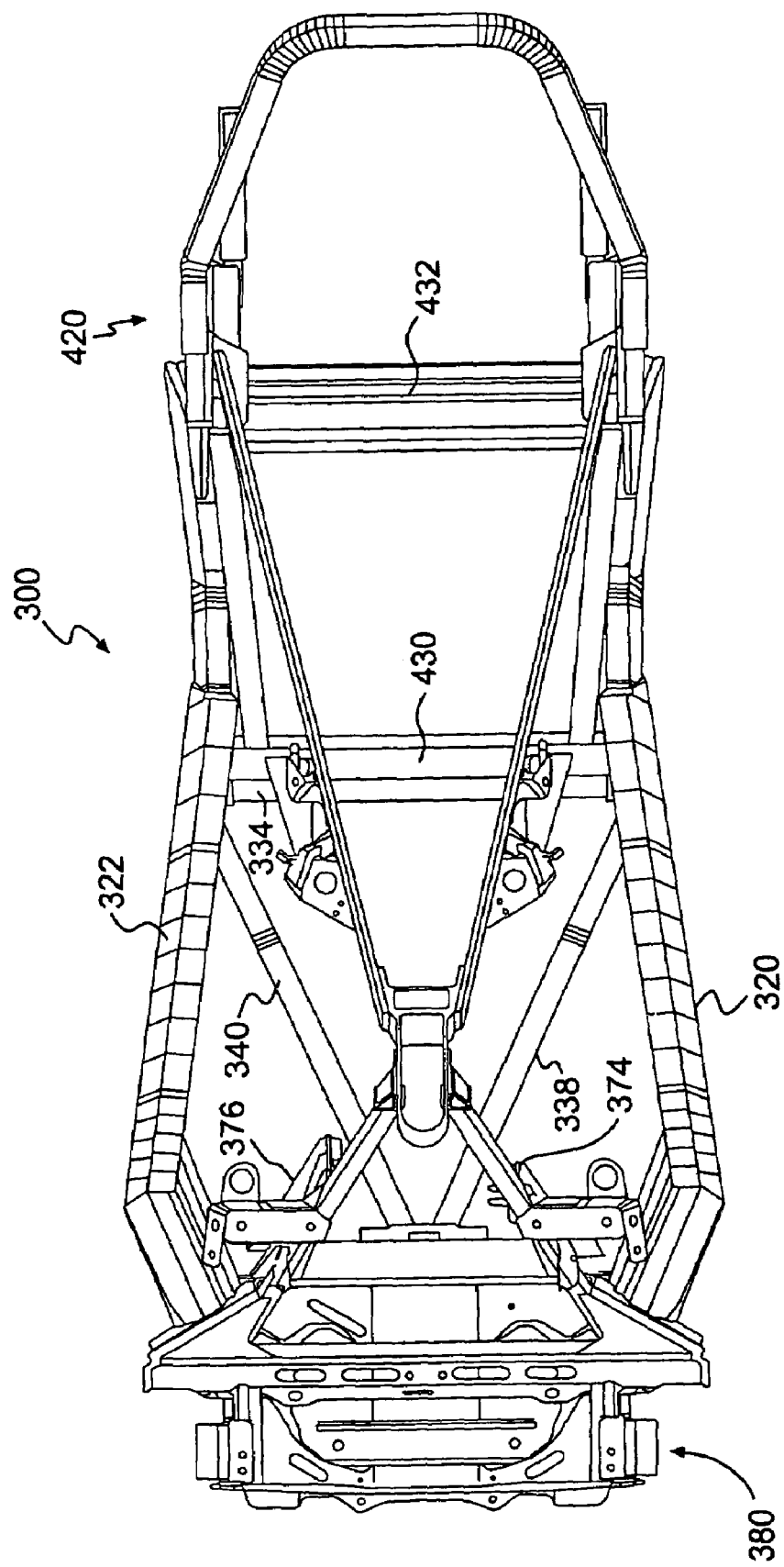
FIG. 7 is a top view of the frame assembly.
Figure 8:
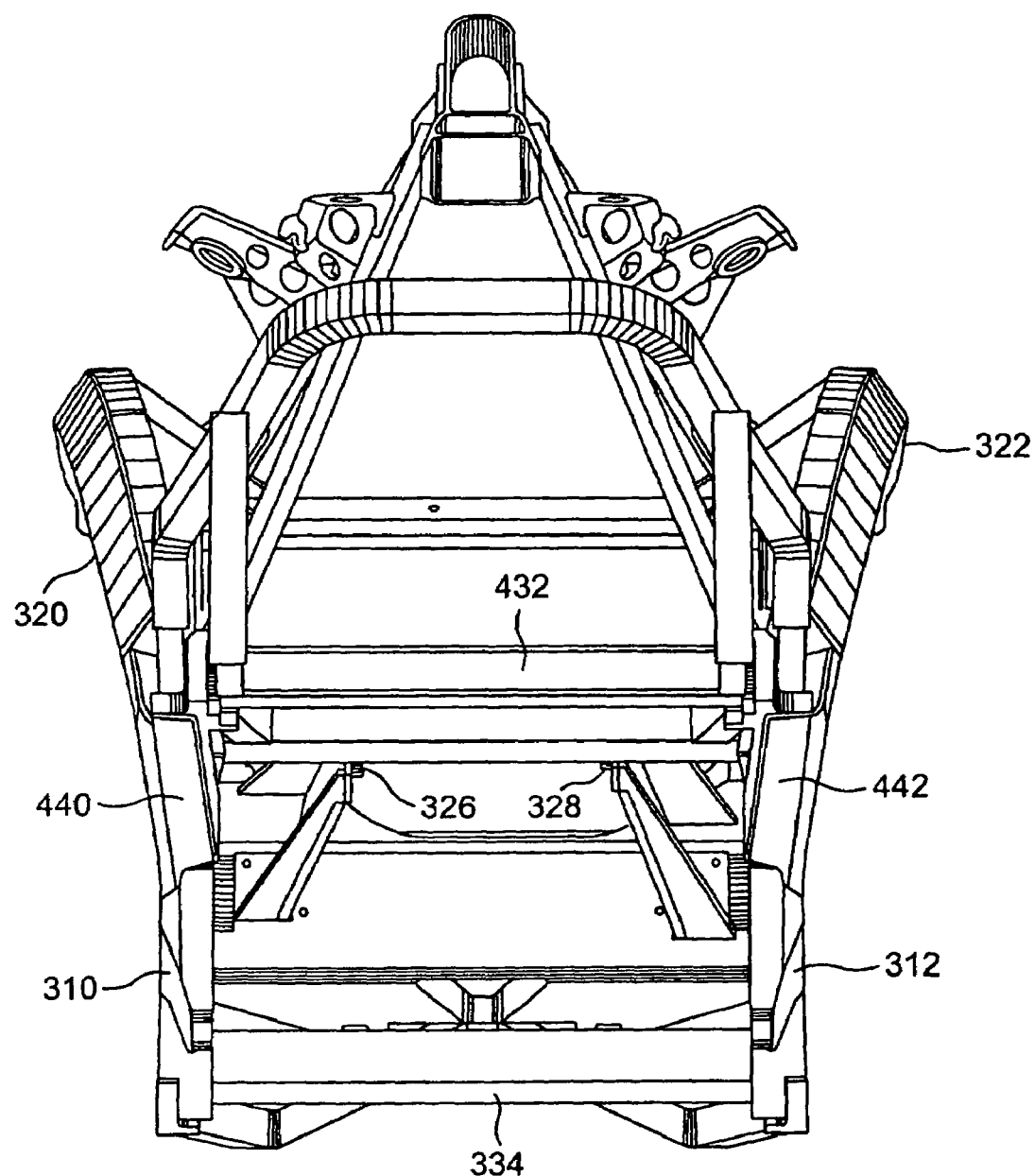
FIG. 8 is a rear view of the frame assembly.

FIGS. 1–3 illustrate a three-wheel vehicle 10 according to the present invention. Left and right laterally spaced front wheels 30, 32, with left and right tires 34, 36, are supported by a front suspension system 600. The front suspension system 600 is supported by a frame assembly 300 (FIG. 4). A steering assembly 50 is mounted to the frame assembly 300 and includes a handlebar mechanism 52 that is operatively connected to the front wheels 30, 32 to steer the vehicle 10. The steering assembly 50 is preferably a progressive steering system.

A rear wheel 56 and tire 58 are supported by a rear suspension system 60. For purposes of the following description, it should be appreciated that the rear wheel 56 may be include a single rim or may include a multi-rim arrangement having a rigid connection between the rims to form the wheel. It should also be appreciated that each rim accommodates a tire. In the case of a multi-rim arrangement, the plurality of rear tires may be in contact with one another or spaced from each other or a combination of spaced and touching. An engine 66 is supported by the frame assembly 300 and operatively connected to the rear wheel 56 to power the vehicle 10. A cushioned straddle-type rider seat 70 is mounted to the frame assembly 300 between the forward wheels 30, 32 and the rear wheel 56.

Referring to FIGS. 4–8, the frame assembly 300 of the vehicle 10 includes left and right laterally spaced rear suspension plates 310, 312. The rear suspension plates 310, 312 generally form vertically and longitudinally extending reinforced plates. The suspension plates 310, 312 are preferably made of a strong light material such as cast aluminum. Left and right laterally extending swing arm pivot bores 314, 316 are centrally disposed on each suspension plate 310, 312 to accommodate pivotal mounting of a rear swing arm 400 (FIG. 9) of the rear suspension system 60.

Laterally-spaced left and right upper spars 320, 322 extend upwardly and forwardly from upper forward portions of the left and right rear suspension plates 310, 312, respectively. The upper spars 320, 322 arc slightly upwardly as they progress forwardly to provide an attractive shape to the frame assembly 300 when viewed from the side. As illustrated in FIG. 2, the outer sides of the right upper spar 322 is visible from the right side of the vehicle 10. The left upper spar 320 is similarly visible from the left side of the vehicle 10.

An engine cradle assembly 330 extends forwardly from the lower front ends of the rear suspension plates 310, 312. The engine cradle assembly 330 includes a rear engine support cross brace 334 that extends laterally between the lower front ends of the left and right rear suspension plates 310, 312. Laterally spaced left and right lower rear engine anchors 336, 337 extend forwardly from the rear lower engine support cross brace 334.

The engine cradle assembly 330 also includes left and right lower spars 338, 340 having rearward portions 342, 344 that are connected to the lower forward ends of the left and right rear suspension plates 310, 312, respectively. The lower spars 338, 340 extend forwardly and laterally inwardly from their respective rearward portions to their forward portions 346, 348. A laterally extending support leg bracket 360 is connected to the forward portions 346, 348 of the lower spars 338, 340. The left and right lower spars 338, 340 and the engine support cross brace 334 generally form a triangle when viewed from above.

The engine cradle assembly 330 further includes a forward engine cradle plate 370 that is connected to a forward portion of the support leg bracket 360. The plate 370 generally extends vertically and laterally and includes several small bends along lateral fold lines that improve the rigidity of the plate 370. Left and right forward engine anchors 374, 376 extend rearwardly and upwardly from the plate 370.

A seat support assembly 420 is connected between the rear suspension plates 310, 312. The seat support assembly 420 includes left and right longitudinal legs 424, 426. The longitudinal legs 424, 426 include forward portions that are connected to forward upper portions of the suspension plates 310, 312, respectively, laterally inwardly from where the left and right suspension plates 310, 312 are connected to the spars 320, 322. Left and right upper rear engine anchors 326, 328 are formed at the intersection between the forward portions of the longitudinal legs 424, 426 and the suspension plates 310, 312.

A forward laterally extending seat frame cross brace 430 is connected between the forward portions of the longitudinal legs 424, 426. A rear suspension link 432 is connected between rearward portions of the longitudinal legs 424, 426. Left and right suspension support links 440, 442 extend upwardly and rearwardly from the upper rearward portions of the rear suspension anchor brackets 310, 312 to the rearward portions of the longitudinal legs 424, 426. Consequently, the rear suspension plates 310, 312, the suspension support links 440, 442, and the longitudinal legs 424, 426 generally form triangles when viewed from the side.

The engine 66 is mounted to the forward engine anchors 374, 376, the upper rear engine anchors 326, 328, and the lower rear engine anchors 336, 337. As the engine 66 is attached to the frame assembly 300 at three different places, as viewed from the side, the engine 66 itself adds structural rigidity to the frame assembly 300 by providing a structural connection between a front suspension sub-frame 380 and the rear suspension plates 310, 312. The engine 66 is operatively connected to a CVT or other type of transmission. The engine 66 and the CVT or transmission are operatively connected to the rear wheel 56.

Figure 9:
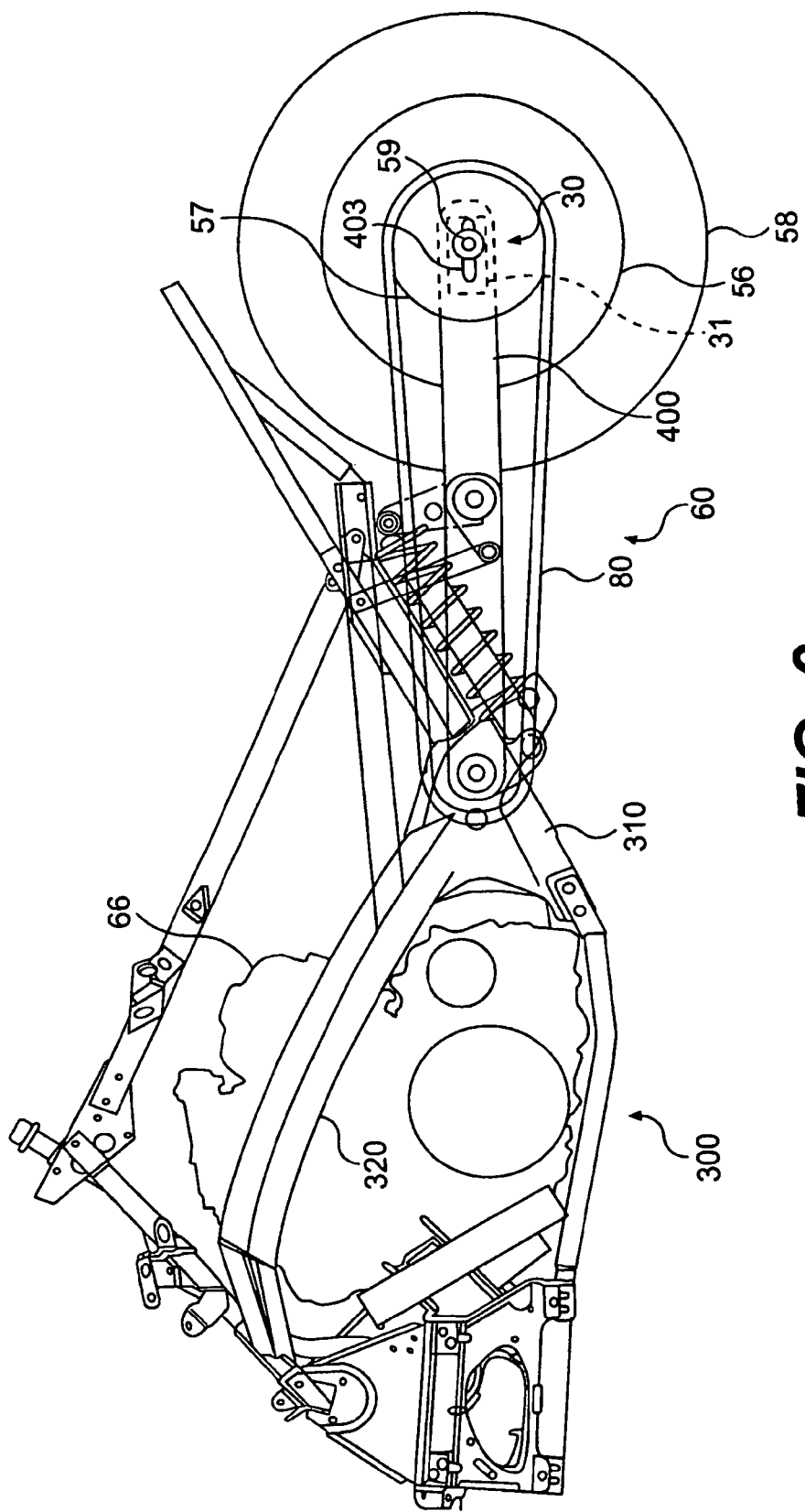
FIG. 9 is a schematic left side view of the rear suspension system connected to the frame assembly and rear wheel according to the present invention.
Figure 10:
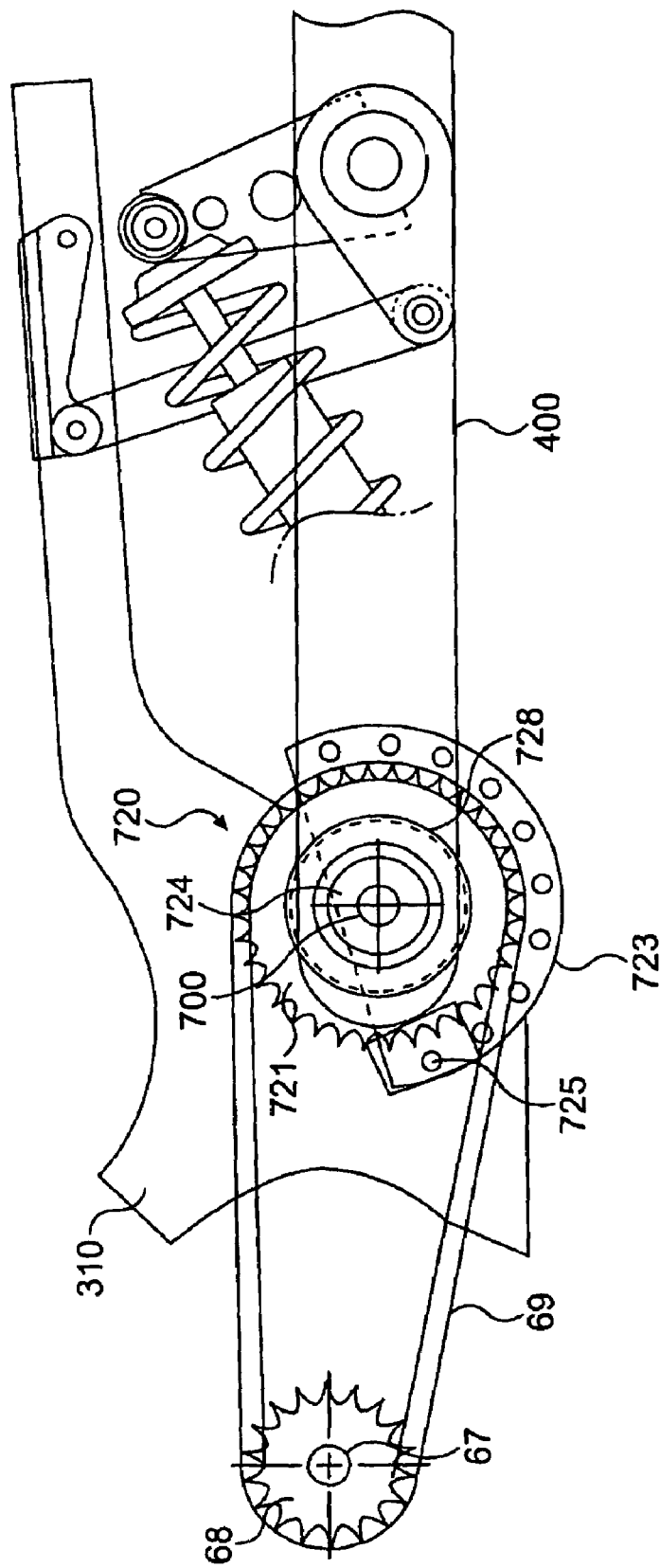
FIG. 10 is a schematic side view of the connection of the rear swing arm to the frame and the concentric intermediate sprocket assembly.
Figure 11:
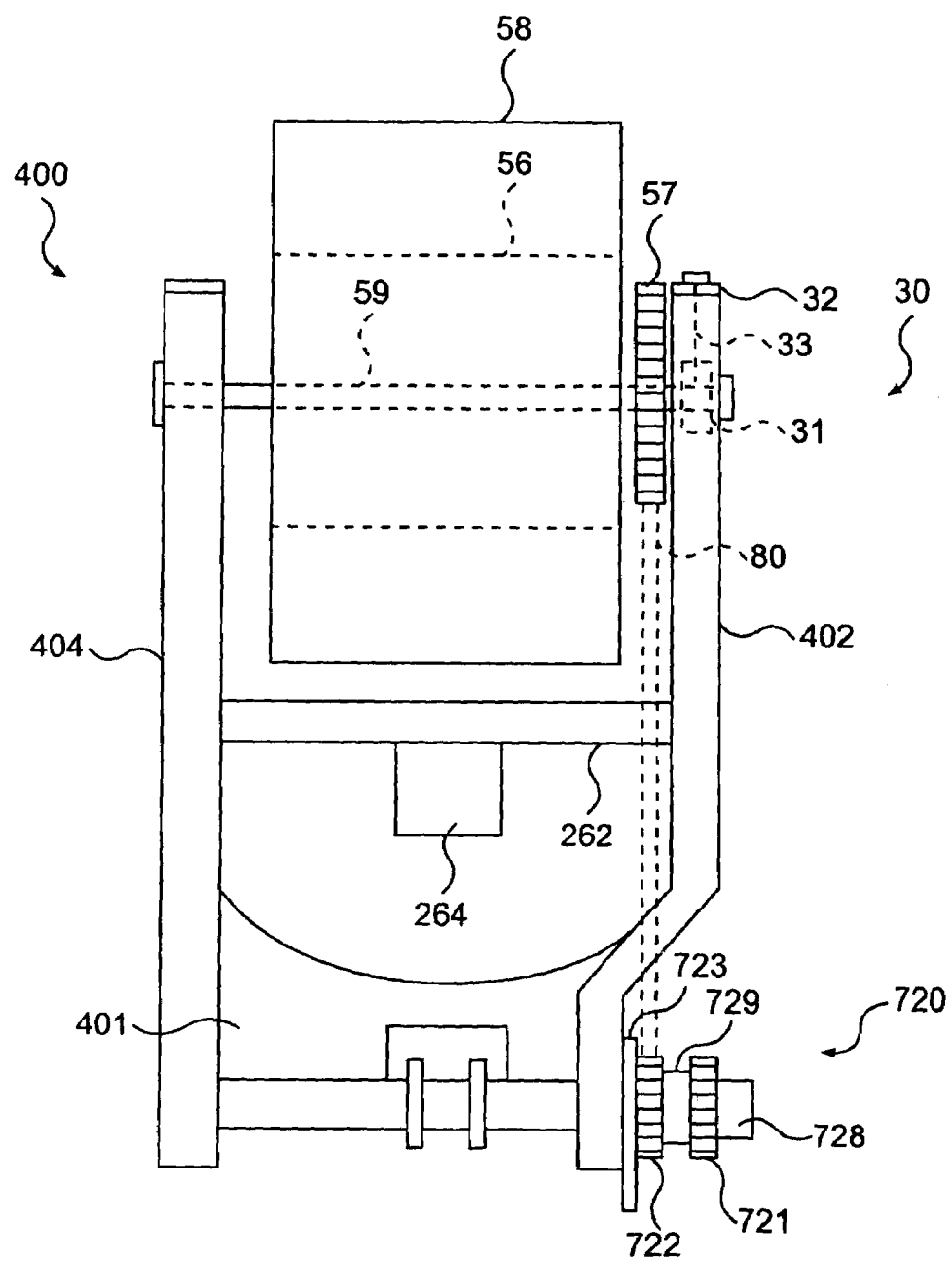
FIG. 11 is a top view of the rear swing arm, including the rear wheel and the concentric intermediate sprocket assembly of FIG. 10 connected thereto.

Referring to FIGS. 9–11, the rear suspension system 60 includes a rear swing arm 400 pivotally attached to the frame assembly 300 by a swing arm axle 700 that passes through the swing arm pivot bores 314, 316 of the rear suspension plates 310, 312, respectively. A concentric intermediate sprocket assembly 720 is supported on one end of the swing arm axle 700.

Referring to FIG. 10, an output shaft 67 of a transmission operatively connected to the engine 66 has a sprocket 68 fixed thereto that engages an endless chain 69. The endless chain 69 engages and drives the intermediate concentric sprocket assembly 720. The concentric intermediate sprocket assembly 720 engages an endless chain 80 that engages and drives a sprocket 57 attached to the rear wheel 56. The sprocket 57 is connected to a rear wheel axle 59. Either or both chains 69 and 80 may be replaced by any mechanical transmission member, for example, an intermediate drive shaft.

As shown in FIG. 11, the rear swing arm 400 is in the shape of a fork and includes left and right tubular fork members 402, 404. A plate 401 is attached to the rear swing arm 400, for example by welding, between the forks 402, 404 to strengthen the rear swing arm 400. A transverse bar 262 is rotatably mounted between the fork members 402, 404. A dual plate extension bracket 264 is fixedly connected to the transverse bar 262. The bracket 264 is connected to one end of a shock absorber of the rear suspension system 60.

The tension of the endless chain 80 may be adjusted by a chain tension adjustment mechanism 30. The chain tension adjustment mechanism 30 includes a block 31 placed within the tubular fork members 402. The block 31 includes an aperture in a central portion through which the rear wheel axle 59 passes. A cap 32 is connected to the end of the tubular fork member 402 and fixed thereon, such as by welding. A threaded member 33 is threaded through the cap 32 and threadedly engages the block 31. Turning of the threaded member 33 moves the block 31 toward and away from the cap 32 along a slot 403 in the tubular fork member 402.

Referring to FIGS. 10 and 11, the intermediate concentric sprocket assembly 720 includes a laterally outer sprocket 721, a laterally inner sprocket 722, a bearing 724 supported in a bearing housing 728, and an eccentric chain tension adjustment mechanism 723. An end of the swing arm axle 700 is received in the bearing 724. The bearing housing 728 is rotatably supported by the bearing 724. The sprockets 721 and 722 are spaced from one another and connected to a spacer member 729. The spacer member 729 is connected to the bearing housing 728 for rotation therewith around the bearing 724. Although the sprockets 721 and 722 are shown with equal diameters, it should be appreciated that the sprockets may have different diameters.

The eccentric chain tension adjustment mechanism 723 is rotatably supported on the swing arm 400 and has an eccentric surface that engages a periphery of the bearing housing 728. Rotation of the eccentric chain tension adjustment mechanism 723 causes the bearing housing 728 to move along the longitudinal axis of the swing arm 400. Movement of the bearing housing 728 toward the output shaft 68 will loosen the chain 69 and tighten the chain 80. Movement of the bearing housing 728 toward the rear wheel 56 will tighten the chain 69 and loosen the chain 80. Loosening or tightening of the chain 80 can be accommodated or compensated for by adjustment of the chain tension adjustment mechanism 30 described above.

The position of the eccentric chain tension adjustment mechanism 723 may be set by an indexing bolt 725 that is selectively placed in one of a plurality of holes or notches 726 in the eccentric chain tension adjustment mechanism 723. The indexing bolt 725 threadedly engages a portion of the swing arm 400. It should be appreciated that other indexing mechanisms may be used and that an eccentric chain tension adjustment mechanism having an infinite number of positions may also be used.

As shown in FIGS. 9–11, the outer sprocket 721 engages and drives the chain 69 and the inner sprocket 722 engages and drives the chain 80. It should be appreciated that the outer sprocket 721 may engage and drive the chain 80 and the inner sprocket 722 may engage and drive the chain 69.

By supporting the intermediate concentric sprocket assembly 720 on the swing arm axle 700, the length of chain 80 remains constant regardless of the up and down displacement of the rear wheel 56, unlike prior art vehicles in which the sprocket assembly is supported such that the sprocket assembly is movable with respect to the vehicle frame, which causes a lengthening or shortening of the chain length as the vehicle suspension is displaced. In the vehicle 10 according to the present invention, as the rear wheel 56 and the swing arm 400 are displaced, no slack is developed in the chain 80 and the possibility of the chain 80 disengaging from either sprocket 57 or sprocket 722 is significantly reduced. No tension is developed in the chain 80 as the rear wheel 56 is displaced and the possibility of chain breakage is significantly reduced as the rear wheel 56 and swing arm 400 are displaced.

Figure 12:
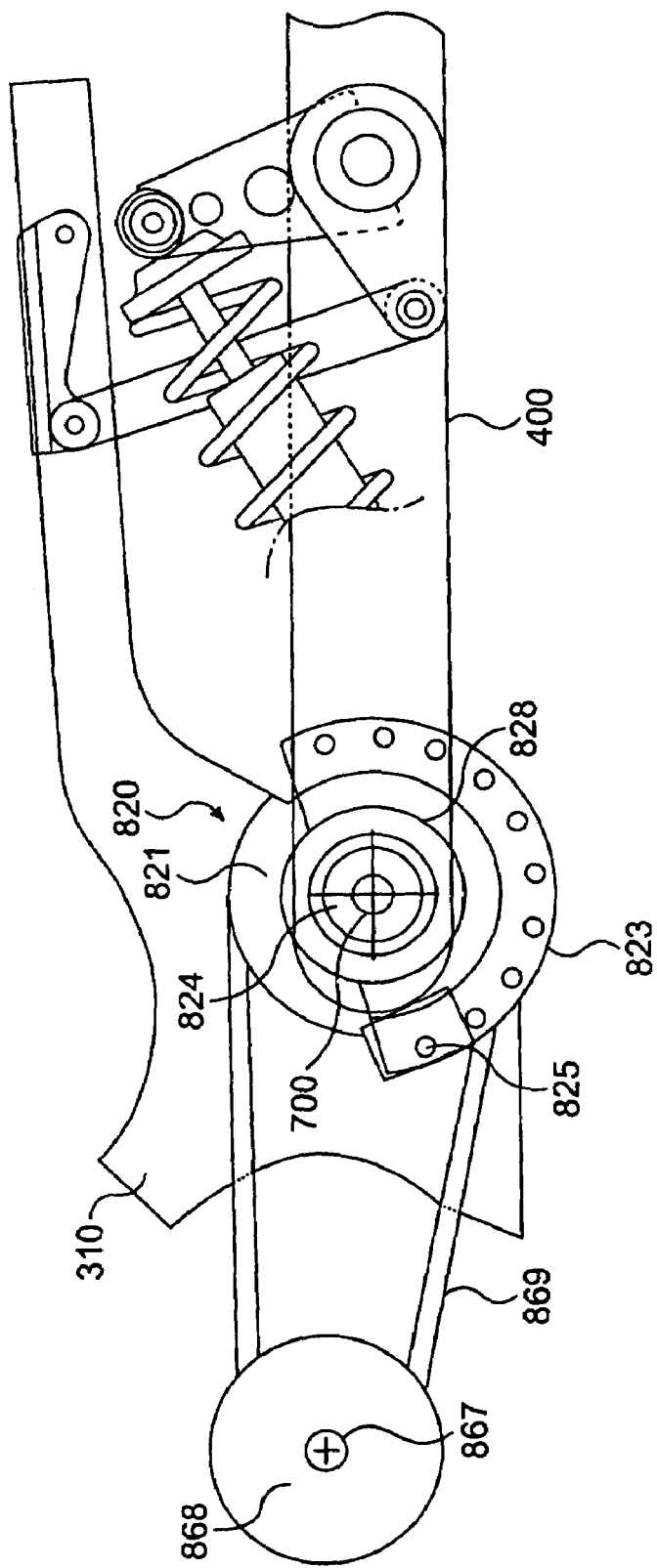
FIG. 12 is a schematic side view of the connection of the rear swing arm to the frame and a concentric intermediate sprocket assembly according to another embodiment of the present invention.
Figure 13:
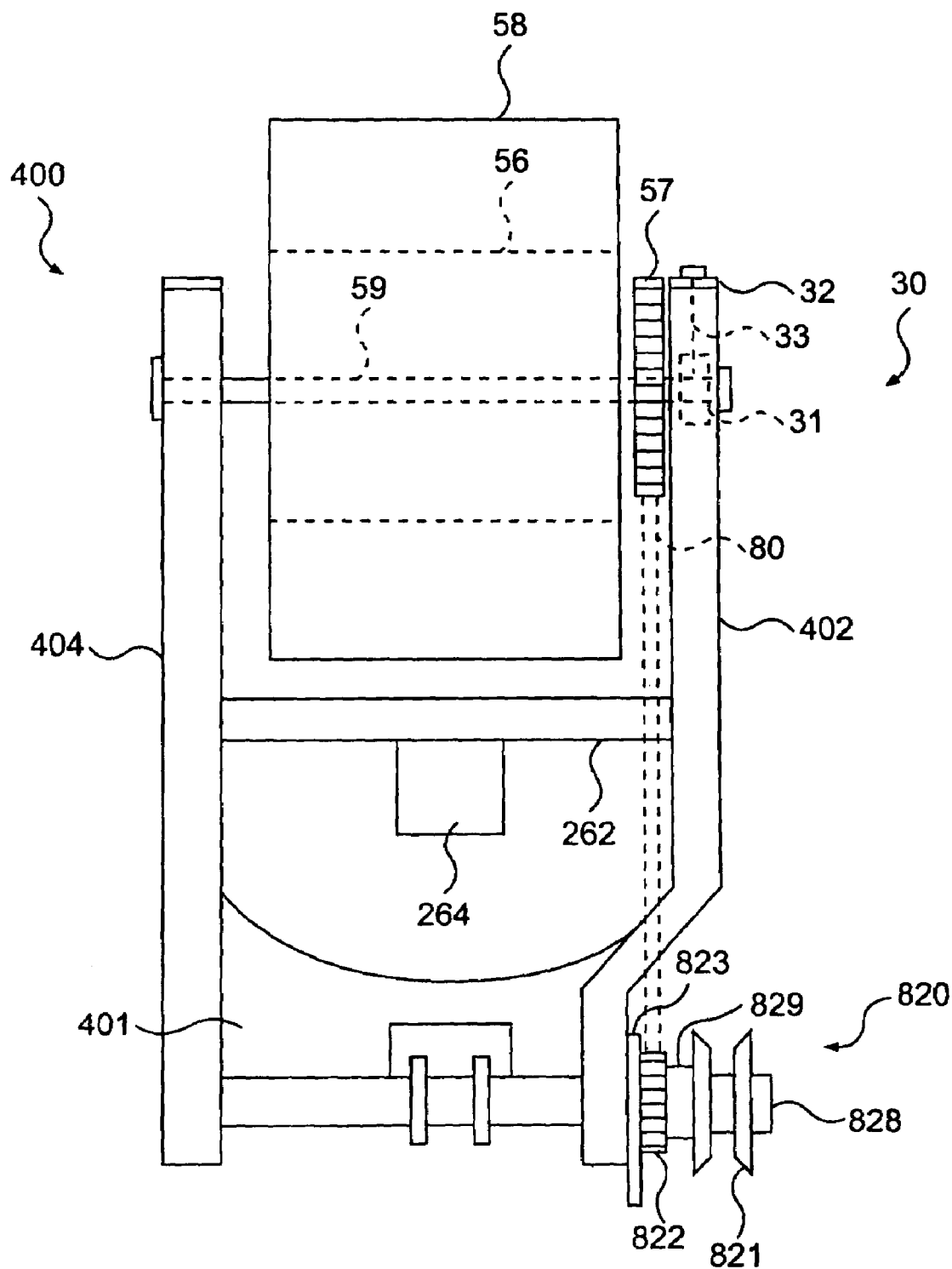
FIG. 13 is a top view of a rear swing arm, including the rear wheel and the concentric intermediate sprocket assembly of FIG. 12 connected thereto according to one embodiment of the present invention.

Referring to FIGS. 12 and 13, an alternate embodiment of the concentric intermediate sprocket assembly 820 is used with a CVT connected to the engine 66. A pulley 868 of a CVT is connected to an output shaft 867 of the engine 66 and drives a pulley 821 of the CVT through an endless belt 869. The concentric intermediate sprocket assembly 820 includes an eccentric chain tension adjustment mechanism 823, a bearing 824 that receives an end of the swing arm axle 700 and a bearing housing 828 that is adjustable along the longitudinal axis of the swing arm 400 by rotation of the eccentric chain tension adjustment mechanism 823. A sprocket 822 drives the chain 80 that is connected between the sprocket 822 and the rear wheel sprocket 57 to power the rear wheel 56.

As the pulleys 868 and 821 are driven directly by the output shaft of the engine 66, it is necessary to reduce the speed of the pulley 821 transmitted to the sprocket 822. A gear box 829, preferably including a planetary gear set, is connected between the pulley 821 and the sprocket 822 to reduce the speed transmitted to the sprocket 822 and provide a reverse "gear."

The tension in the chain 80 may be adjusted by the eccentric chain tension adjustment mechanism 823. When the tension in the chain 80 is reduced by moving the sprocket 822 towards the rear wheel 56, the tension in the belt 869 increases as the pulley 821 moves away from the pulley 868. Conversely, when the tension in the chain 80 is increased by moving the sprocket 822 away from the rear wheel 56, the tension in the belt decreases as the pulley 821 moves toward the pulley 868. It is apparent to one of ordinary skill in the art that a belt tension adjustment mechanism is necessary to compensate for changes in the tension in the belt 869 of the CVT as the tension in the chain 80 is adjusted by the eccentric chain tension adjusting mechanims 823.

Figure 14:
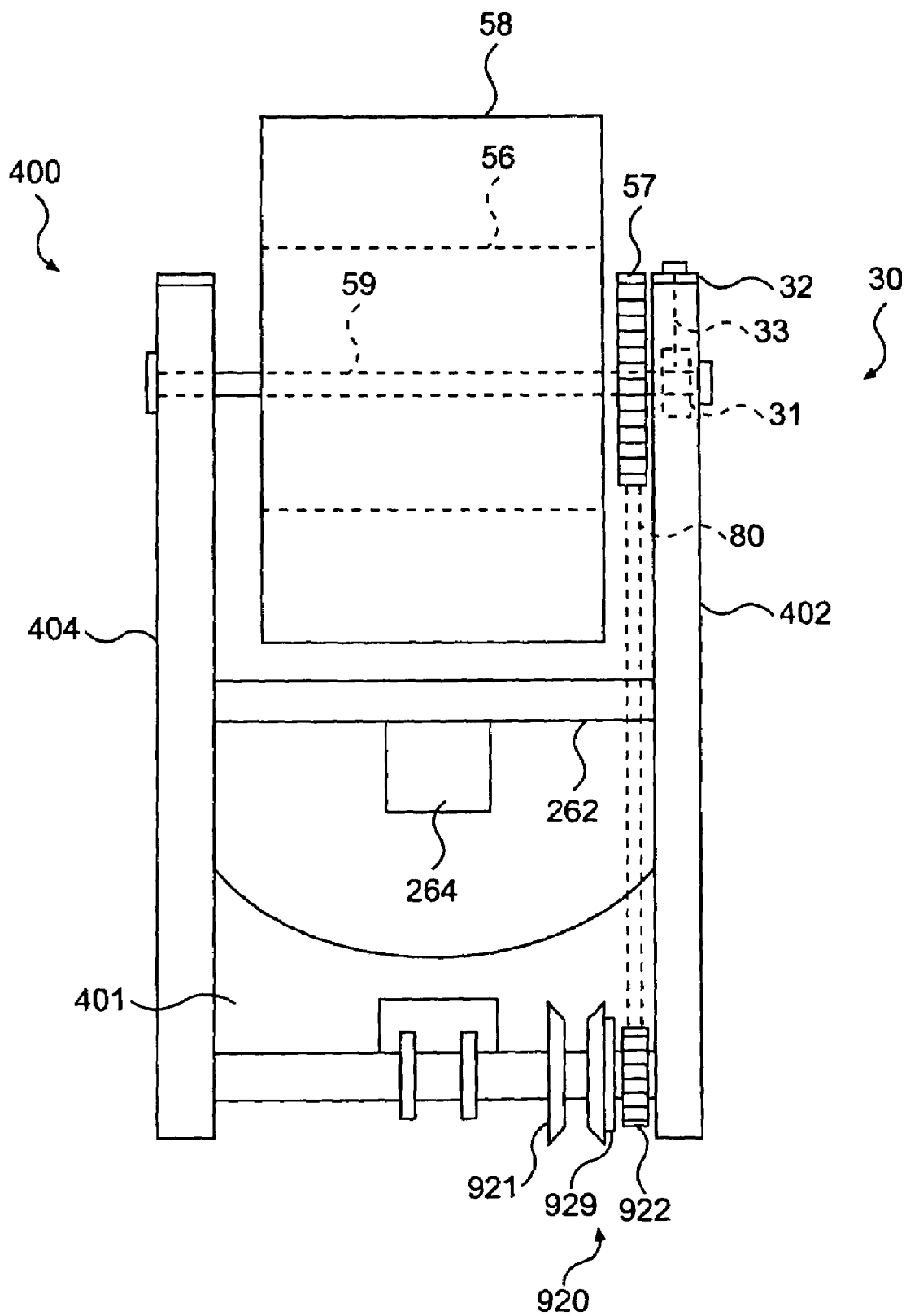
FIG. 14 is a top view of a rear swing arm, including the rear wheel and the concentric intermediate sprocket assembly of FIG. 12 connected thereto according to another embodiment of the present invention.

Referring to FIG. 14, a further embodiment of a concentric intermediate sprocket assembly 920 according to the present invention includes a sprocket 922 and a pulley 921 of a CVT operatively connected to the engine 66. A gear box 929 reduces the speed transmitted to the sprocket 922 from the pulley 921 and provides a reverse gear. The concentric intermediate sprocket assembly 920 is placed laterally inward of the fork member 402.

Figure 15:
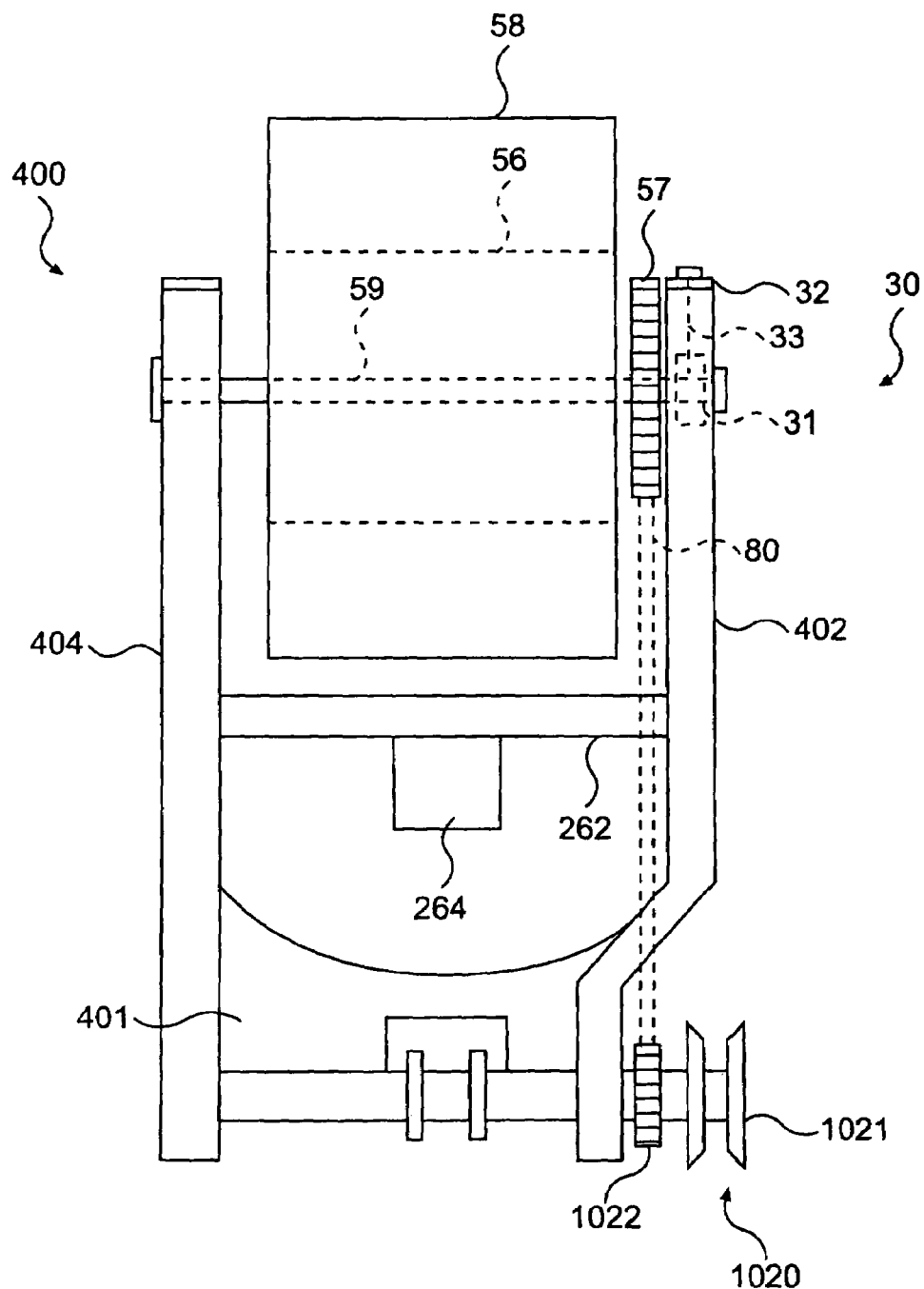
FIG. 15 is a top view of a rear swing arm, including the rear wheel and the concentric intermediate sprocket assembly of FIG. 12 connected thereto according to another embodiment of the invention.

Referring to FIG. 15, a further embodiment of a concentric intermediate sprocket assembly 1020 according to the present invention includes a sprocket 1022 and a pulley 1021 of a CVT operatively connected to the engine 66. There is no speed reduction or reverse gear between the pulley 1021 and the sprocket 1022.

Figure 16:
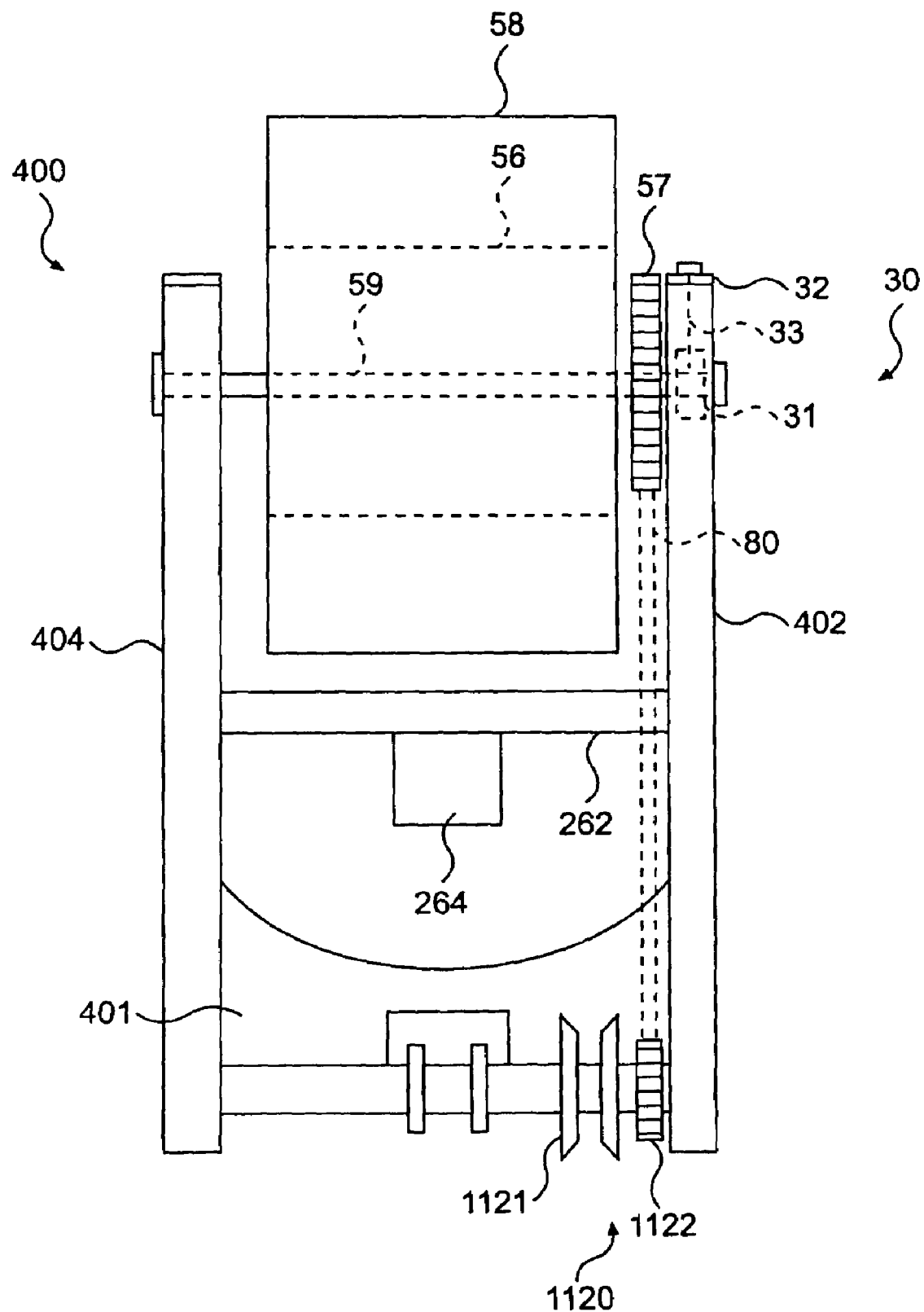
FIG. 16 is a top view of a rear swing arm, including the rear wheel and the concentric intermediate sprocket assembly of FIG. 12 connected thereto according to another embodiment of the present invention.

Referring to FIG. 16, a further embodiment of a concentric intermediate sprocket assembly 1120 according to the present invention includes a sprocket 1122 and a pulley 1121 of a CVT operatively connected to the engine 66. There is no speed reduction or reverse gear between the pulley 1121 and the sprocket 1122. The concentric intermediate sprocket assembly 1120 is placed laterally inward of the fork member 402.

Figure 17:
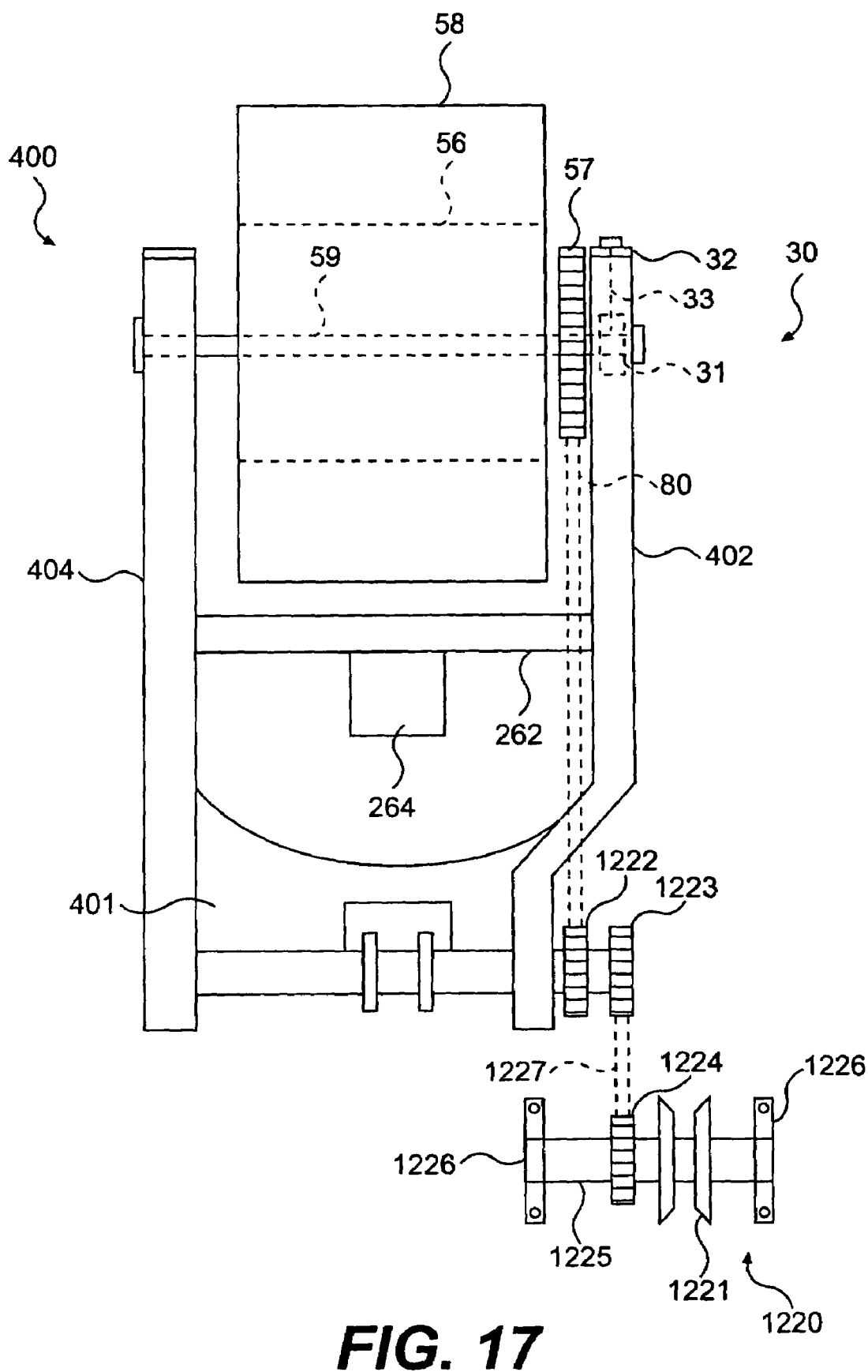
FIG. 17 is a top view of a rear swing arm and a concentric intermediate sprocket assembly according to another embodiment of the present invention.

Referring to FIG. 17, a further embodiment of a concentric intermediate sprocket assembly 1220 according to the present invention includes a pulley 1221 of a CVT operatively connected to the engine 66. A sprocket 1224 is fixed on a shaft 1225 with the pulley 1221. The shaft 1225 is supported at both ends by bearings 1226 that are attached to the frame assembly 300 or engine 66 or both. A sprocket 1223 is operatively connected to the sprocket 1224 by an endless chain 1227. The sprocket 1223 has a larger diameter than the sprocket 1224 and speed reduction is provided between the sprockets 1224 and 1223. A sprocket 1222 is operatively connected to the rear wheel 56 by the endless chain 80 and the rear wheel sprocket 57 to drive the rear wheel 56.

Figure 18:
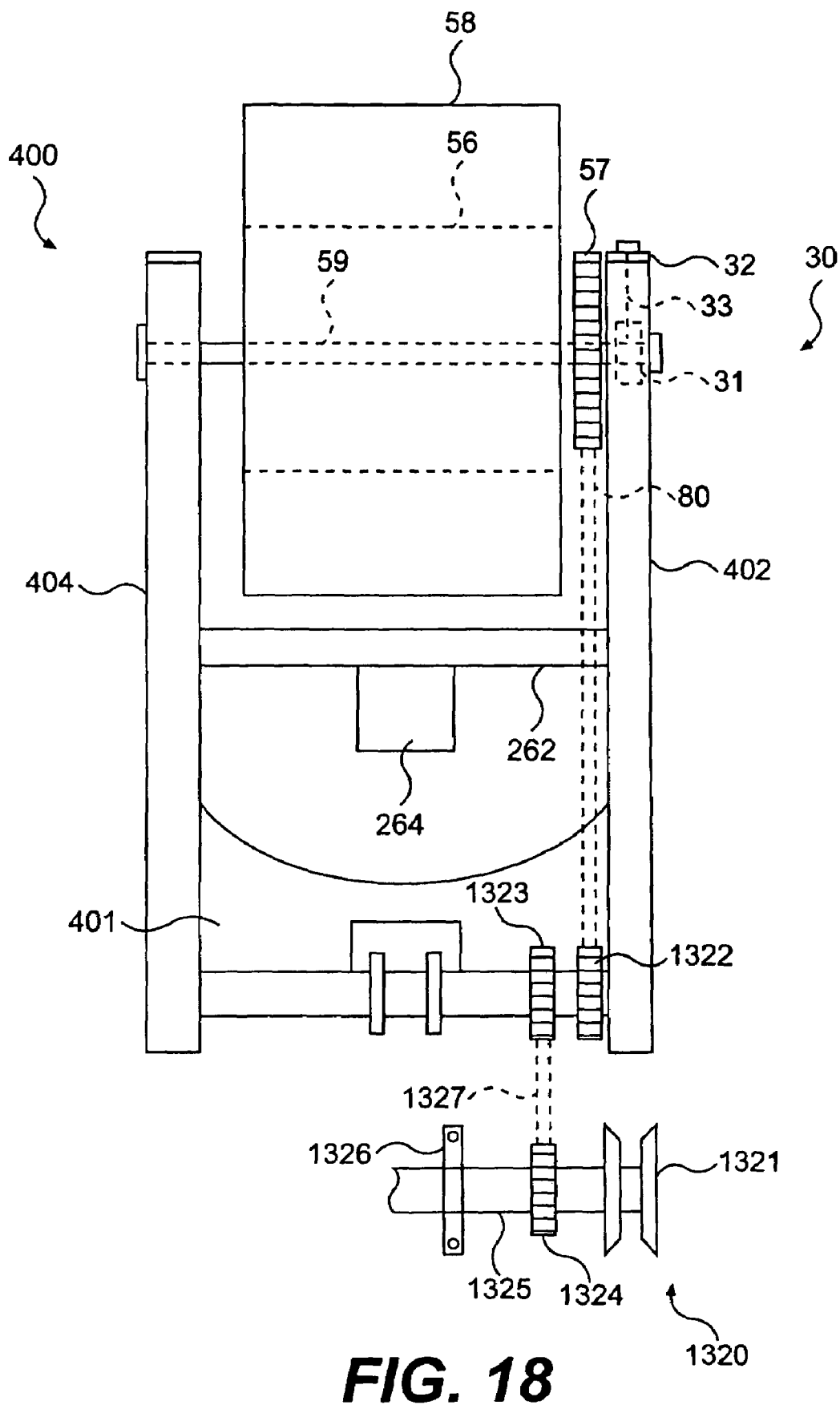
FIG. 18 is a top view of a rear swing arm and a concentric intermediate sprocket assembly according to another embodiment of the present invention.

Referring to FIG. 18, a further embodiment of a concentric intermediate sprocket assembly 1320 according to the present invention includes a pulley 1321 of a CVT operatively connected to the engine 66. A sprocket 1324 is fixed on a shaft 1325 with the pulley 1321. The shaft 1325 is supported by a bearing 1326 that is attached to the frame assembly 300 or the engine 66 or both. A sprocket 1323 is operatively connected to the sprocket 1324 by an endless chain 1327. The sprocket 1323 has a larger diameter than the sprocket 1324 and speed reduction is provided between the sprockets 1324 and 1323. A sprocket 1322 is operatively connected to the rear wheel 56 by the endless chain 80 and the rear wheel sprocket 57 to drive the rear wheel 56. The concentric intermediate sprocket assembly 1320 is placed laterally inward of the tubular fork member 402.

Although not shown in FIGS. 14–18, it should be understood that the concentric intermediate sprocket assemblies 920, 1020, 1120, 1220 and 1320 each include an eccentric chain tension adjusting mechanism that adjusts the position of the sprockets 922, 1022, 1122, 1222 and 1322, respectively, the adjust the tension in the endless chain 80. It should also be appreciated that the CVT's of FIGS. 13–18 may be any other type of transmission, for example an automatic transmission.

The foregoing illustrated embodiments are provided to illustrate the structural and functional principles of the present invention and are not intended to be limiting. To the contrary, various modifications are possible without departing from the spirit and scope of the present invention.

What is claimed is:

1. A vehicle, comprising:
   a frame;
   an engine supported by the frame;
   at least one rear wheel;
   a swing arm, the swing arm rotatably supporting the at least one rear wheel at a first end and pivotally connected to the frame at a second end at a pivot point;
   a concentric sprocket assembly attached to the frame at the pivot point, the concentric sprocket assembly including a first sprocket and a second sprocket;
   a first transmission member operatively connecting an output shaft of the engine and the first sprocket; and
   a second endless flexible transmission member operatively connected between the rear wheel and the second sprocket.

2. A vehicle according to claim 1, wherein the second sprocket is spaced laterally inward of the vehicle from the first sprocket.

3. A vehicle according to claim 1, further comprising an eccentric endless flexible transmission member tension adjustment mechanism on the swing arm that adjusts the position of the concentric sprocket assembly along a longitudinal axis of the swing arm.

4. A vehicle according to claim 3, wherein the eccentric endless flexible transmission member tension adjustment mechanism is indexable among a plurality of positions.

5. A vehicle according to claim 4, wherein the eccentric endless flexible transmission member tension adjustment mechanism is fixed in one of the plurality of positions by a member in engagement with the eccentric endless flexible transmission member tension adjustment mechanism and the swing arm.

6. A vehicle according to claim 1, wherein the concentric sprocket assembly includes a bearing that receives an end of a swing arm axle that connects the swing arm to the frame and a housing rotatably supported by the bearing, and the first and second sprockets are spaced by and fixed to a spacer fixed to the housing.

7. A vehicle according to claim 1, further comprising an adjustment mechanism at the first end of the swing arm that adjusts the position of the at least one rear wheel along a longitudinal axis of the swing arm.

8. A vehicle according to claim 1, wherein the first and second sprockets have equal diameters.

9. A vehicle according to claim 1, wherein the first transmission member is one of an endless flexible transmission member and a drive shaft.

10. A vehicle, comprising:
a frame;
an engine supported by the frame;
at least one front wheel supported by the frame;
at least one rear wheel;
a swing arm, the swing arm rotatably supporting the at least one rear wheel at a first end and pivotally connected to the frame at a second end at a pivot point;
a concentric sprocket assembly attached to the frame at the pivot point, the concentric sprocket assembly including a sprocket and a pulley;
a first endless flexible transmission member operatively connecting an output shaft of the engine and the pulley; and
a second endless flexible transmission member operatively connected between the rear wheel and the second sprocket.

11. A vehicle according to claim 10, wherein the sprocket is spaced laterally inward of the vehicle from the pulley.

12. A vehicle according to claim 10, wherein the sprocket is spaced laterally outward of the vehicle from the pulley.

13. A vehicle according to claim 10, wherein the sprocket and the pulley are operatively connected by a gear arrangement.

14. A vehicle according to claim 13, wherein the gear arrangement includes a gear box between the sprocket and pulley.

15. A vehicle according to claim 14, wherein the gear arrangement includes at least two sprockets connected by at least a third endless flexible transmission member between the sprocket and the pulley.

16. A vehicle according to claim 13, wherein the gear arrangement reduces speed transmitted from the pulley to the sprocket.

17. A vehicle according to claim 10, wherein the at least one front wheel and the at least one rear wheel have tires that are suitable for road use.

18. A vehicle according to claim 17, wherein the at least one front and rear tires are pressurized to between about 20 psi (138 kPa) to 50 psi (345 kPa).

19. A vehicle according to claim 18, wherein the at least one front tire has a width of about 6.5 inches (165 mm) to 10 inches (254 mm).

20. A vehicle according to claim 19, wherein the at least one rear tire has a width of about 7.5 inches (190 mm) to 14 inches (355 mm).

* * * * *